(No Model.) 3 Sheets—Sheet 1.

J. HARTNESS.
FRICTION CLUTCH.

No. 530,339. Patented Dec. 4, 1894.

WITNESSES:
A. D. Harrison
D. P. Davis

INVENTOR:
Jas. Hartness
by Wright, Brown & Crosby
Attys.

(No Model.)  3 Sheets—Sheet 2.

J. HARTNESS.
FRICTION CLUTCH.

No. 530,339. Patented Dec. 4, 1894.

WITNESSES:
A. D. Harrison
F. P. Davis

INVENTOR:
Jas. Hartness
by Wright, Brown & Crosby
Attys.

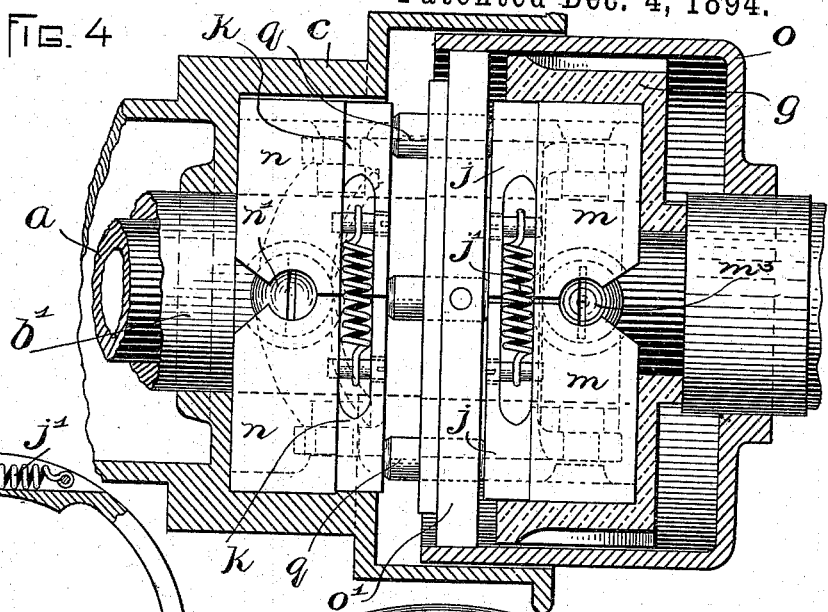
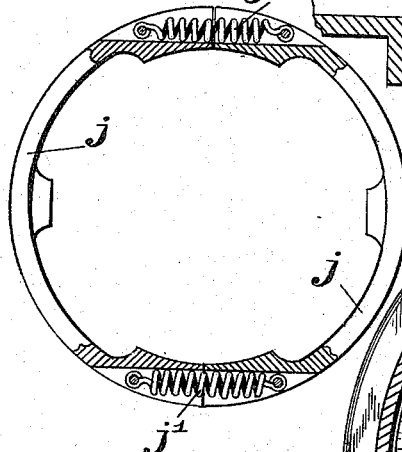
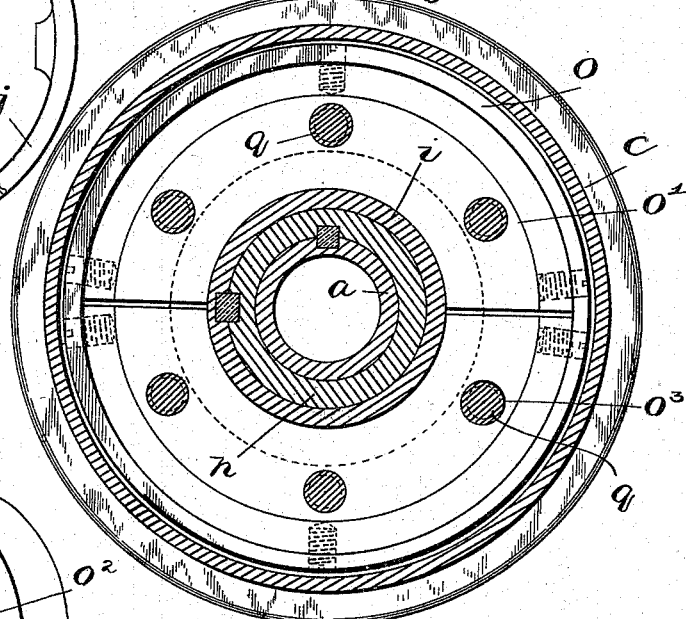
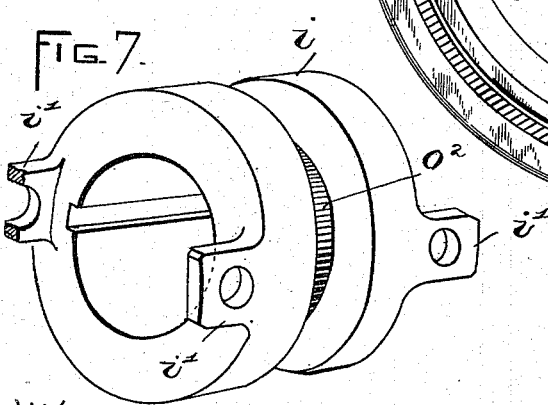

UNITED STATES PATENT OFFICE.

JAMES HARTNESS, OF SPRINGFIELD, VERMONT.

FRICTION-CLUTCH.

SPECIFICATION forming part of Letters Patent No. 530,339, dated December 4, 1894.

Application filed April 19, 1894. Serial No. 508,106. (No model.)

*To all whom it may concern:*

Be it known that I, JAMES HARTNESS, of Springfield, in the county of Windsor and State of Vermont, have invented certain new and useful Improvements in Friction-Clutches, of which the following is a specification.

The object of the present invention is to provide a clutch better adapted for use in a turret-lathe head than any heretofore devised, the special requirements of a clutch for use in this connection being great durability and tenacity, in view of the fact that a spindle of large diameter is driven by a cone-pulley and gear of comparatively small diameter.

To the above end, the invention contemplates the employment of toggles for effecting the connection of parts, and involves numerous provisions adjunctive thereto, all of which will be recited in the appended claims and specifically described hereinafter.

The accompanying drawings, which form part of this specification, illustrate a construction embodying the invention.

Figure 1:
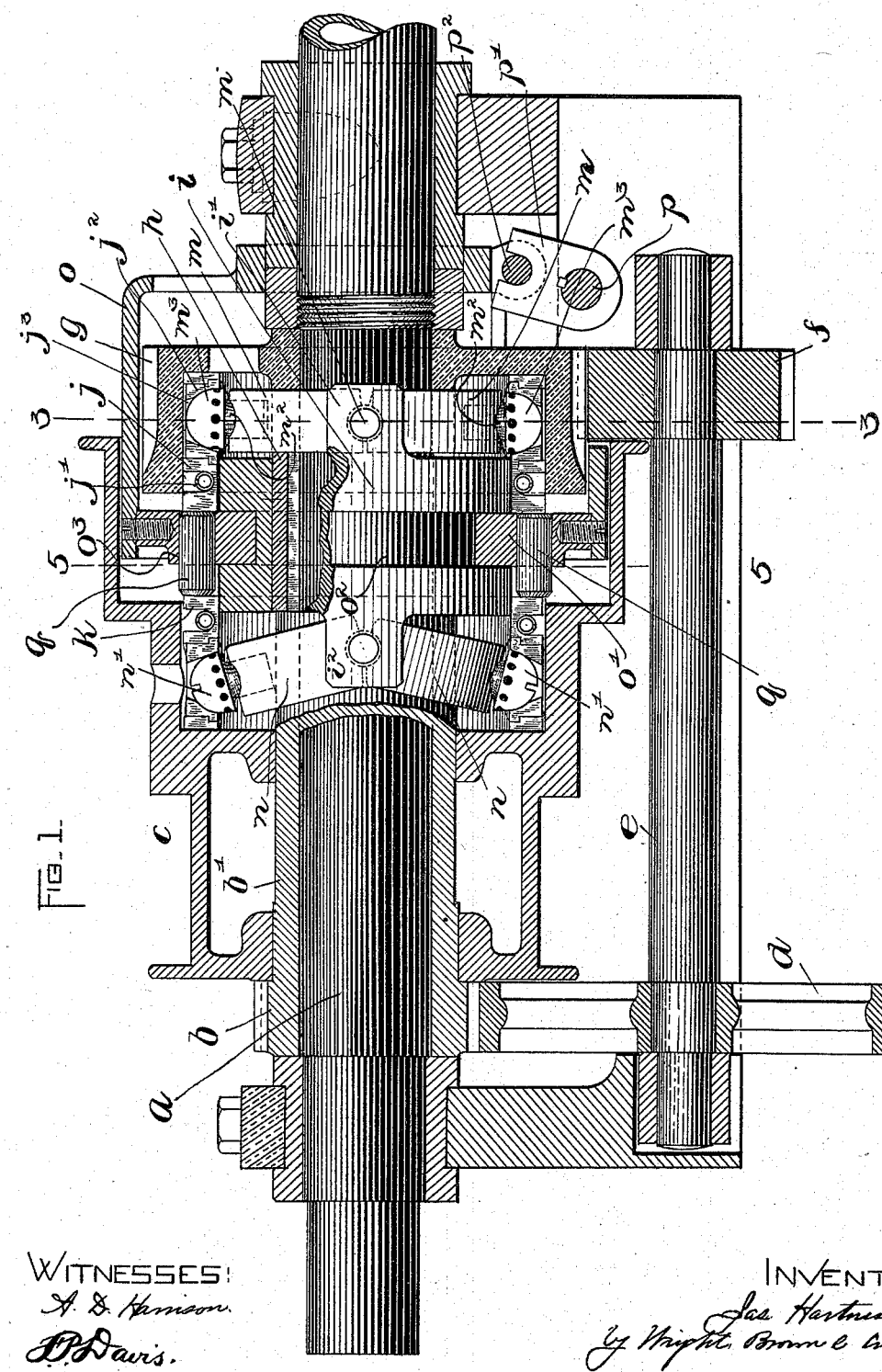
Figure 2:
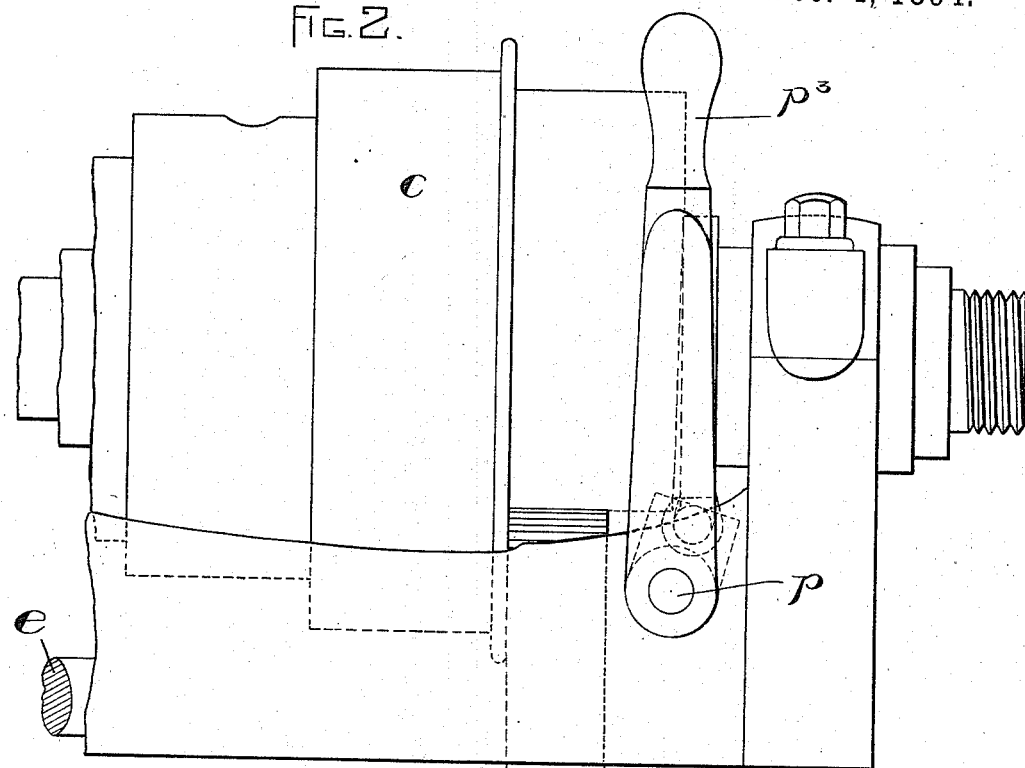
Figure 3:
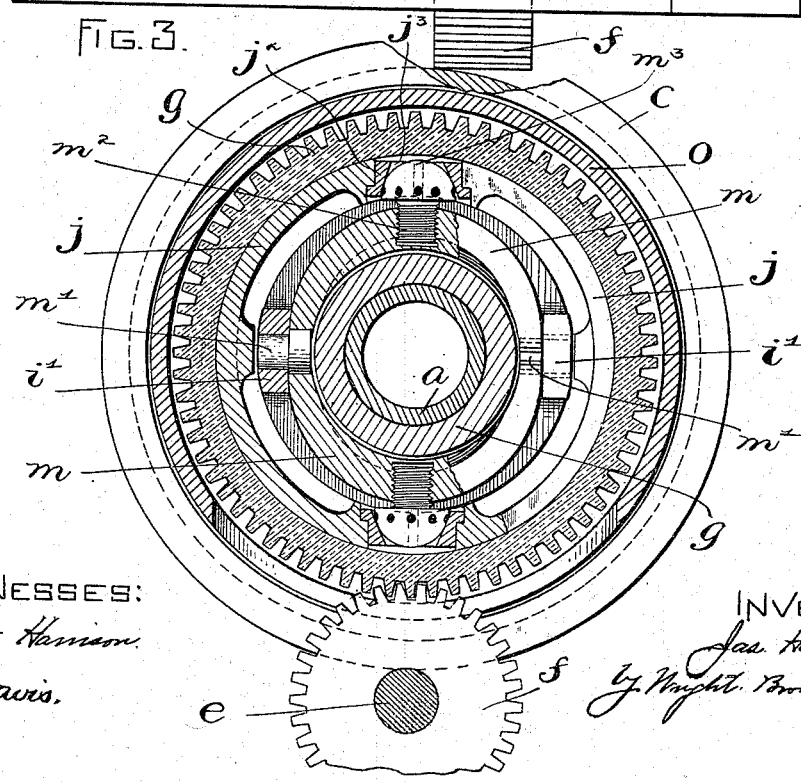

Figure 1 represents a longitudinal vertical section of a turret-lathe head equipped with the improved clutch mechanism, certain parts appearing in elevation and others being represented as broken away. Fig. 2 represents the lathe-head in side elevation. Fig. 3 represents a vertical cross-section on line 3—3 of Fig. 1. Fig. 4 represents a top plan view of the clutch parts, with the surrounding parts in section. Fig. 5 represents a vertical section on line 5—5 of Fig. 1. Fig. 6 represents a part elevation and part sectional view of one of the friction rings. Fig. 7 represents a perspective view of a sliding sleeve which carries the toggles.

The lathe-head here shown is of a well-known type, and comprises the spindle $a$, pinion $b$ loose thereon, cone-pulley $c$ affixed on the quill $b'$ of said pinion, gear $d$ in mesh with said pinion and affixed on a shaft $e$, pinion $f$ affixed on said shaft, and gear $g$ meshing with said pinion and loosely mounted on the spindle $a$. A sleeve $h$ keyed on the spindle between the quill $b'$ and hub of gear $g$ supports a sliding sleeve $i$ which is keyed to it so as to rotate at all times with the spindle. Within the gear $g$ and encircling the sleeve $i$ is a friction ring composed of two semi-circular sections $j$ which are connected together by spiral springs $j'$ lying in grooves in the ring-sections and attached to pins extending across said grooves. These springs tend to hold the ring closely around the sleeve and out of contact with the interior annular wall of the gear. The confronting ends of the ring-sections are fitted with blocks or bushings $j^2$ of better wearing quality than the material of which the ring-sections are made, and said bushings are formed with tapering or angular confronting faces $j^3$, together constituting conical bores to receive spreading or expanding devices hereinafter described, which by acting against said angular faces force the ring-sections against the interior annular wall of the gear.

A ring of similar construction to that above described is arranged for engagement with a suitable interior wall of the cone-pulley, said ring being composed of two semi-circular sections $k$ embracing the sleeve and held together by springs.

Semi-circular or forked toggles $m$ straddle the hub of the gear $g$ and are carried by the sleeve $i$, which is formed with ears $i'$ supporting pivot-pins $m'$ for said toggle to turn on, and extending over the end-portions of the toggles so as to prevent spreading thereof.

The toggle-members $m$ carry adjusting screws $m^2$ formed with rounded heads $m^3$ which engage the tapering bores formed by the confronting end-faces $j^3$ of the bearing blocks $j^2$ in the ring-sections $j$. These rounding screw-heads are designed to act as wedges against said confronting faces and expand the ring against the interior wall of the gear.

A set of toggles $n$ of similar construction to those above described is carried by ears $i^2$ on the opposite end of the sleeve $i$, and these toggles $n$ carry adjusting screws $n'$ for engagement with the ring $k$.

It will be observed that when one set of toggles is straightened out, the other is broken, and vice versa. Under the adjustment shown in Fig. 1, the toggles $m$ are straightened, and the gear $g$ is therefore rotatively connected with the spindle through the toggles and the sleeve $i$. While this condition obtains, power is transmitted to the spindle from the pulley $c$ through the pinion $b$, gear $d$, and pinion $f$. Movement of the sleeve $i$ to the left breaks the toggles $m$ and straightens out the toggles $n$, thereby disconnecting the gear $g$ and spindle, and connecting the pulley directly with the spindle. Under this adjustment, the spindle is rotated at the pulley speed, and the gear $g$ revolves loosely at its former speed.

The shifting of the sleeve $i$ is effected through the following connections: A drum $o$ partially inclosing the gear $g$ has a hub with a sliding fit on a sleeve on the spindle, and a head $o'$ engaging an annular groove $o^2$ encircling the sleeve $i$. A short shaft $p$ carries a crank $p'$ slotted to engage a pin $p^2$ fastened in ears on the drum, and also a handle $p^3$ at the front of the head. It will be seen that by operating this handle the sleeve $i$ may be shifted. The drum-head $o'$ is provided with a number of transverse holes $o^3$, which are fitted with pins $q$ bearing at opposite ends against the friction rings $j$ and $k$, and serving to keep them apart and in their proper place.

In a lathe-head, it is highly desirable that parts which revolve loosely on the spindle shall have ample length of hub, and therefore the hub of the gear $g$ extends over that part of the spindle which in other machines is ordinarily covered by the holder carrying the friction-ring and expanding device. The semi-circular toggles $m$ clear this hub of the gear $g$, and at the same time afford a powerful expanding means.

That side of the clutch which engages with the pulley is not of so much importance as the side engaging the gear, and an ordinary friction clutch will suffice, in view of the fact that the work done under this adjustment does not call for greater power than that afforded by the direct pull of the belt, whereas work done under the other adjustment requires from four to sixteen times the direct pull of the belt.

The invention is not limited to the described details of construction.

Having thus described my invention, what I claim as new, and desire to secure by Letters Patent, is—

1. A friction clutch for connecting a shaft or spindle and a rotary power-transmitting device thereon, the same comprising an expanding ring for frictional engagement with the said rotary power-transmitting device, forked toggles embracing the shaft or a spindle and constructed to engage and expand the ring, and a sliding support for the central joint of said toggles rotatively engaged with the shaft or spindle.

2. A friction clutch for connecting a shaft or spindle and a rotary power-transmitting device thereon, the same comprising an expanding ring for frictional engagement with the said rotary power-transmitting device, semi-circular toggles straddling the shaft or spindle and having provisions for engaging and expanding the ring, and a sliding sleeve rotatively engaged with the shaft or spindle and having ears extending over the ends of the semi-circular toggles and carrying the pivot-pins which support the same.

3. A friction clutch for connecting a shaft or spindle and a rotary power-transmitting device thereon, the same comprising an expanding ring for frictional engagement with the said rotary power-transmitting device; forked toggles embracing the shaft, and each carrying a centrally located adjustable wedge for expanding the ring; and a sliding support for the central joint of said toggles rotatively engaged with the shaft.

4. A friction clutch for connecting a shaft or spindle and a rotary power-transmitting device thereon, the same comprising a sectional expanding ring for frictional engagement with the said rotary power-transmitting device and yieldingly held together and having angular confronting end faces, forked toggles straddling the shaft or spindle and having adjusting screws with wedge-like heads to engage the angular faces of the ring-sections, and a sliding support for the central joint of said toggles rotatively engaged with the shaft or spindle.

5. A friction clutch for connecting a shaft or spindle with a rotary power-transmitting device thereon, the same comprising a sliding sleeve rotatively engaged with the shaft or spindle, a sectional expanding ring yieldingly held together over the sleeve and adapted for frictional engagement with the said rotary power-transmitting device, and forked toggles straddling the shaft or spindle and supported by the sleeve, said toggles having provisions for engaging and expanding the sectional ring.

6. The combination with a shaft or spindle and a pulley and gear thereon, of friction clutch mechanism comprising a sliding support rotatively engaged with the shaft or spindle, expanding rings for frictionally engaging the pulley and gear respectively, and two sets of forked toggles carried by the sliding support and embracing the shaft and adapted for engagement with the expanding rings respectively.

7. The combination with a shaft or spindle and a pulley and gear thereon, of friction clutch mechanism comprising a sliding sleeve rotatively engaged with the shaft or spindle, expanding rings embracing said sleeve and arranged for frictional engagement with the pulley and gear respectively, separating pins between the said rings and arranged in a suitable support, and two sets of toggles carried by the sleeve and engaging the expanding rings.

In testimony whereof I have signed my name to this specification, in the presence of two subscribing witnesses, this 14th day of April, A. D. 1894.

JAMES HARTNESS.

Witnesses:
P. J. DONOVAN,
G. O. GRIDLEY.